(12) United States Patent
Elyashiv et al.

(10) Patent No.: US 11,716,338 B2
(45) Date of Patent: Aug. 1, 2023

(54) SYSTEM AND METHOD FOR DETERMINING A FILE-ACCESS PATTERN AND DETECTING RANSOMWARE ATTACKS IN AT LEAST ONE COMPUTER NETWORK

(71) Applicant: TWEENZNET LTD., Tel Aviv-Jaffa (IL)

(72) Inventors: Eyal Elyashiv, Ramat Hasharon (IL); Eliezer Upfal, Providence, RI (US); Aviv Yehezkel, Ramat-Gan (IL)

(73) Assignee: TWEENZNET LTD., Tel Aviv-Jaffa (IL)

( * ) Notice: Subject to any disclaimer, the term of this patent is extended or adjusted under 35 U.S.C. 154(b) by 325 days.

(21) Appl. No.: 17/104,190

(22) Filed: Nov. 25, 2020

(65) Prior Publication Data

US 2021/0160257 A1    May 27, 2021

Related U.S. Application Data (60) Provisional application No. 62/940,266, filed on Nov. 26, 2019.

(51) Int. Cl.
*H04L 9/40* (2022.01)
*G06N 3/08* (2023.01)

(52) U.S. Cl.
CPC ........... *H04L 63/1416* (2013.01); *G06N 3/08* (2013.01); *H04L 63/1425* (2013.01)

(58) Field of Classification Search
USPC .................................................. 726/22–25
See application file for complete search history.

(56) References Cited

U.S. PATENT DOCUMENTS

| 6,208,640 | B1 |   | 3/2001 | Spell et al. |
| 8,401,982 | B1 | * | 3/2013 | Satish .................... G06N 20/00 706/20 |

(Continued)

FOREIGN PATENT DOCUMENTS

| CN | 104253819 | 12/2014 |
| CN | 107465643 | 12/2017 |

(Continued)

OTHER PUBLICATIONS

Yang et al.; A Simple Recurrent Unit Model Based Intrusion Detection System With DCGAN; IEEE (Year: 2019).*

(Continued)

*Primary Examiner* — Kambiz Zand
*Assistant Examiner* — Mahabub S Ahmed
(74) *Attorney, Agent, or Firm* — Pearl Cohen Zedek Latzer Baratz LLP (57) ABSTRACT

Systems and methods of determining file-access patterns in at least one computer network, the network comprising a file-access server, including training a first machine learning (ML) algorithm with a first training dataset comprising vectors representing network traffic such that the first ML algorithm learns to determine network characteristics associated with file-access traffic, determining, using the first ML algorithm, network characteristics based on highest interaction of traffic with the file-access server compared to other interactions in the at least one computer network, and determining file-access patterns in the at least one computer network based on the network characteristics associated with file-access traffic.

14 Claims, 7 Drawing Sheets

(56) References Cited

U.S. PATENT DOCUMENTS

| | | | |
|---|---|---|---|
| 8,479,276 B1* | 7/2013 | Vaystikh | G06F 21/577 713/160 |
| 8,713,190 B1 | 4/2014 | Goodall et al. | |
| 9,166,993 B1* | 10/2015 | Liu | H04L 63/1425 |
| 9,317,686 B1* | 4/2016 | Ye | G06F 21/566 |
| 9,690,938 B1* | 6/2017 | Saxe | G06N 3/045 |
| 9,942,254 B1* | 4/2018 | Averbuch | H04L 63/145 |
| 10,032,025 B1* | 7/2018 | Patton | G06F 21/568 |
| 10,078,459 B1* | 9/2018 | Natanzon | G06F 3/067 |
| 10,122,752 B1* | 11/2018 | Soman | H04L 63/0227 |
| 10,242,665 B1* | 3/2019 | Abeloe | G06N 3/047 |
| 10,248,577 B2* | 4/2019 | Borlick | G06F 3/067 |
| 10,505,955 B2* | 12/2019 | Mestha | G06F 21/577 |
| 10,554,688 B1* | 2/2020 | Wueest | H04L 63/1416 |
| 10,802,489 B1* | 10/2020 | Abeloe | G10L 13/047 |
| 10,834,121 B2* | 11/2020 | Bochare | G06F 21/566 |
| 10,893,068 B1* | 1/2021 | Khalid | G06F 21/554 |
| 11,082,441 B1* | 8/2021 | Bouguerra | G06N 3/045 |
| 11,159,407 B2* | 10/2021 | Reid | H04L 47/72 |
| 11,269,622 B2* | 3/2022 | Alam | G06N 3/044 |
| 11,368,432 B2* | 6/2022 | Meyer | H04L 63/0263 |
| 11,436,328 B1* | 9/2022 | Strogov | G06F 16/128 |
| 2004/0077347 A1 | 4/2004 | Lauber et al. | |
| 2006/0072709 A1 | 4/2006 | Rancu et al. | |
| 2009/0034521 A1 | 2/2009 | Kato | |
| 2009/0144545 A1* | 6/2009 | Dhuvur | G06F 21/552 713/165 |
| 2010/0058122 A1* | 3/2010 | Compton | H04L 47/2483 714/57 |
| 2010/0157840 A1 | 6/2010 | Sen et al. | |
| 2011/0238855 A1 | 9/2011 | Korsunsky et al. | |
| 2011/0242994 A1 | 10/2011 | Carvalho et al. | |
| 2013/0263272 A1* | 10/2013 | Banerjee | G06F 21/51 726/25 |
| 2014/0090061 A1* | 3/2014 | Avasarala | G06F 21/566 726/24 |
| 2015/0128263 A1 | 5/2015 | Raugas et al. | |
| 2016/0028752 A1 | 1/2016 | Di Pietro et al. | |
| 2016/0055410 A1* | 2/2016 | Spagnola | G06N 3/02 706/16 |
| 2016/0065424 A1 | 3/2016 | Lee et al. | |
| 2016/0234167 A1* | 8/2016 | Engel | H04L 63/1408 |
| 2017/0316342 A1* | 11/2017 | Franc | G06N 20/10 |
| 2018/0007069 A1* | 1/2018 | Hunt | H04L 63/1408 |
| 2018/0007074 A1* | 1/2018 | Kune | H04Q 9/00 |
| 2018/0048693 A1 | 2/2018 | Gulbinas et al. | |
| 2018/0069893 A1* | 3/2018 | Amit | G06F 21/554 |
| 2018/0091506 A1 | 3/2018 | Chow et al. | |
| 2018/0107824 A1* | 4/2018 | Gibbons, Jr. | G06F 21/565 |
| 2018/0109551 A1 | 4/2018 | Wetterwald et al. | |
| 2018/0113638 A1* | 4/2018 | Petersen | G06F 3/0619 |
| 2018/0198821 A1* | 7/2018 | Gopalakrishna | H04L 63/1416 |
| 2018/0205750 A1* | 7/2018 | Kohout | G06F 21/554 |
| 2018/0211038 A1* | 7/2018 | Breiman | G06F 21/568 |
| 2018/0212987 A1* | 7/2018 | Tamir | G06F 11/1461 |
| 2018/0270262 A1 | 9/2018 | Zhang et al. | |
| 2018/0373722 A1* | 12/2018 | Ulasen | G06N 3/045 |
| 2019/0020663 A1* | 1/2019 | Bartos | H04L 43/08 |
| 2019/0042744 A1* | 2/2019 | Rajasekharan | G06F 21/565 |
| 2019/0068618 A1* | 2/2019 | Mestha | H04L 63/1441 |
| 2019/0087572 A1* | 3/2019 | Ellam | G06F 21/56 |
| 2019/0130097 A1* | 5/2019 | Berler | G06F 21/562 |
| 2019/0147343 A1* | 5/2019 | Lev | G06F 7/023 706/25 |
| 2019/0171936 A1* | 6/2019 | Karras | G06N 3/084 |
| 2019/0190938 A1 | 6/2019 | Oba et al. | |
| 2019/0215329 A1* | 7/2019 | Levy | G06F 21/56 |
| 2019/0221311 A1* | 7/2019 | Takeuchi | G06N 3/02 |
| 2019/0228099 A1* | 7/2019 | Bajaj | G06N 3/044 |
| 2019/0236273 A1* | 8/2019 | Saxe | G06N 3/045 |
| 2019/0253452 A1* | 8/2019 | Latapie | G06F 16/182 |
| 2019/0258426 A1* | 8/2019 | Roh | G06F 13/16 |
| 2019/0258920 A1* | 8/2019 | Lie | G06F 9/3016 |
| 2019/0303573 A1* | 10/2019 | Chelarescu | G06F 16/16 |
| 2019/0317901 A1* | 10/2019 | Kachare | G06F 12/1009 |
| 2019/0318244 A1* | 10/2019 | Alvarez | G06N 3/047 |
| 2019/0332769 A1* | 10/2019 | Fralick | G06F 21/554 |
| 2019/0385057 A1* | 12/2019 | Litichever | H04L 63/14 |
| 2020/0021620 A1* | 1/2020 | Purathepparambil | H04L 63/102 |
| 2020/0034537 A1* | 1/2020 | Chen | G06F 16/951 |
| 2020/0067935 A1* | 2/2020 | Carnes, III | H04L 63/101 |
| 2020/0089876 A1* | 3/2020 | Aharoni | G06F 21/554 |
| 2020/0089884 A1* | 3/2020 | Winokur | G06F 21/566 |
| 2020/0090002 A1* | 3/2020 | Zhu | G06N 3/088 |
| 2020/0097653 A1* | 3/2020 | Mehta | G06N 3/045 |
| 2020/0133489 A1* | 4/2020 | Martin | G06F 12/0862 |
| 2020/0137110 A1* | 4/2020 | Tyler | H04L 63/1483 |
| 2020/0137384 A1* | 4/2020 | Kwong | H04N 19/11 |
| 2020/0204589 A1* | 6/2020 | Strogov | G06N 20/00 |
| 2020/0244672 A1* | 7/2020 | Grill | H04L 63/1433 |
| 2020/0250522 A1* | 8/2020 | Meiri | G06F 21/552 |
| 2020/0272899 A1* | 8/2020 | Dunne | G06N 3/08 |
| 2020/0387609 A1* | 12/2020 | Hansen | G06F 21/554 |
| 2020/0387798 A1* | 12/2020 | Hewage | G06N 3/045 |
| 2020/0412757 A1* | 12/2020 | Siddiq | H04L 63/20 |
| 2021/0019403 A1* | 1/2021 | Mehta | G06N 3/045 |
| 2021/0026961 A1* | 1/2021 | Underwood | G06F 16/9027 |
| 2021/0044563 A1* | 2/2021 | Reyes | G06F 21/564 |
| 2021/0044604 A1* | 2/2021 | Annen | G06F 21/565 |
| 2021/0049456 A1* | 2/2021 | Kursun | G06F 18/217 |
| 2021/0055907 A1* | 2/2021 | Bielby | G06F 3/165 |
| 2021/0072901 A1* | 3/2021 | Kale | G06F 3/067 |
| 2021/0072911 A1* | 3/2021 | Kale | G06N 3/049 |
| 2021/0072921 A1* | 3/2021 | Bielby | G06F 3/0679 |
| 2021/0073127 A1* | 3/2021 | Bielby | G06F 12/0802 |
| 2021/0099474 A1* | 4/2021 | Huang | G06N 3/088 |
| 2021/0216627 A1* | 7/2021 | Grunwald | G06F 12/0246 |
| 2021/0216630 A1* | 7/2021 | Karr | G06F 21/57 |
| 2021/0264028 A1* | 8/2021 | Genc | G06F 21/566 |
| 2022/0232024 A1* | 7/2022 | Kapoor | G06F 16/9535 |
| 2022/0261506 A1* | 8/2022 | Steinberg | G06F 21/64 |
| 2022/0311794 A1* | 9/2022 | Maya | G06F 11/3065 |

FOREIGN PATENT DOCUMENTS

| | | |
|---|---|---|
| WO | WO-2018/069928 | 4/2018 |
| WO | WO 2019/154483 | 8/2019 |

OTHER PUBLICATIONS

Maniath et al.; Deep Learning LSTM based Ransomware Detection; IEEE (Year: 2017).*

Hirano et al.; Machine Learning Based Ransomware Detection Using Storage Access Patterns Obtained From Live-forensic Hypervisor; IEEE (Year: 2019).*

Xu et al.; Malware Detection using Machine Learning Based Analysis of Virtual Memory Access Patterns; IEEE (Year: 2017).*

Chen et al.; Towards resilient machine learning for ransomware detection; ACM (Year: 2019).*

Ahmed et al.; Using Spatio-Temporal Information in API Calls with Machine Learning Algorithms for Malware Detection; ACM (Year: 2009).*

Non-final office action of U.S. Appl. No. 17/024,452, dated Nov. 18, 2021.

S. Bhattacharyya, A. Madeira, S. Muthukrishnan, and T. Ye. "How to scalably and accurately skip past streams". In ICDE, pp. 654-663 (2007).

T. Mori, T. Takine, J. Pan, R. Kawahara, M. Uchida, and S. Goto. "Identifying heavy-hitter flows from sampled flow statistics". IEICE Transactions, 90-B(11):3061-3072, (2007).

T. Mori, M. Uchida, R. Kawahara. J. Pan, and S. Goto. "Identifying elephant flows through periodically sampled packets". In Proceedings of the 4th ACM SIGCOMM Conference on Internet Measurement, pp. 115-120 (2004).

N. G. Duffield, C. Lund, and M. Thorup. Estimating flow distributions from sampled flow statistics. In Proceedings of the ACM SIGCOMM, Conference on Applications, Technologies, Architectures, and Protocols for Computer Communication, pp. 325-336 (2003).

(56) References Cited

OTHER PUBLICATIONS

B. F. Ribeiro, D. F. Towsley, T. Ye, and J. Bolot. "Fisher information of sampled packets: an application to flow size estimation". In Proceedings of the 6th ACM SIGCOMM Conference on Internet Measurement, pp. 1-11 (2006).

N. G. Duffield and C. Lund. "Predicting resource usage and estimation accuracy in an IP flow measurement collection infrastructure". In Proceedings of the 3rd ACM SIGCOMM Internet Measurement Conference, IMC, pp. 179-191 (2003).

N. G. Duffield, C. Lund, and M. Thorup. "Charging from sampled network usage". In Proceedings of the 1st ACM SIGCOMM Workshop on Internet Measurement, pp. 245-256 (2001).

N. G. Duffield, C. Lund, and M. Thorup. "Flow sampling under hard resource constraints." In Proceedings of the International Conference on Measurements and Modeling of Computer Systems, SIGMETRICS, pp. 85-96 (2004).

A. Kumar and J. J. Xu. "Sketch guided sampling—using on-line estimates of flow size for adaptive data collection". In INFOCOM (2006).

R. Cohen, L. Katzir and A. Yehezkel, "MTS Sketch for Accurate Estimation of Set-Expression Cardinalities from Small Samples". CoRR abs/1611.01853 (2016).

R. Cohen, L. Katzir and A. Yehezkel, "Cardinality Estimation Meets Good-Turing". Big Data Research, 9: 1-8 (2017).

Shtilerman E, Thompson CJ, Stone L, Bode M, Burgman M., "A novel method for estimating the number of species within a region". Proc. R. Soc. B 281: 20133009 (2014).

Bunge, J., Fitzpatrick, M. "Estimating the Number of Species: A Review". Journal of the American Statistical Association, 88:421, 364-373. doi:10.2307/2290733 (1993).

Chao, A. "Nonparametric Estimation of the Number of Classes in a Population". Scandinavian Journal of Statistics, 11(4), 265-270. Retrieved Jan. 20, 2020, from www.jstor.org/stable/4615964 (1984).

Good, I.J. "The population frequencies of species and the estimation of population parameters". Biometrika. V40(3-4): 237-264. doi:10.1093/biomet/40.3-4.237. JSTOR 2333344. MR 0061330 (1953).

Diederik P. Kingma and Jimmy Lei Ba. Adam "A method for stochastic optimization", 2014. arXiv:1412.6980v9.

Andrews Jerone TA et al. "Detecting anomalous data using autoencoders", International Journal of Machine Learning and Computing, 6(1):21, (2016).

Chalapathy et al. "Anomaly Detection Using One-Class Neural Networks", arXiv:1802.06360v2, Jan. 11, 2019, pp. 1-13.

Des Combes et al. "Domain Adaptation with Conditional Distribution Matching and Generalized Label Shift", arXiv:2003.04475v1. Mar. 10, 2020, pp. 1-36.

Erfani Sarah M et al. "High-dimensional and largescale anomaly detection using a linear one-class svm with deep learning", Pattern Recognition, 58:121-134, (2016).

Ergen et al. "Unsupervised and Semi-Supervised Anomaly Detection with LSTM Neural Networks", arXiv:1710.0907v1. Oct. 25, 2017 pp. 1-12.

Li et al. "Anomaly Detection with Generative Adversarial Networks for Multivariate Time Series", arXiv:1809.04758v3. Jan. 15, 2019 pp. 1-10.

* cited by examiner

SYSTEM AND METHOD FOR DETERMINING A FILE-ACCESS PATTERN AND DETECTING RANSOMWARE ATTACKS IN AT LEAST ONE COMPUTER NETWORK

CROSS REFERENCE TO RELATED APPLICATION

This application claims benefit of Provisional Application No. 62/940,266, filed Nov. 26, 2019, the entire contents of which is incorporated herein by reference.

FIELD OF THE INVENTION

The present invention relates to traffic in computer networks. More particularly, the present invention relates to systems and methods for determining file-access patterns and using them to detect for example ransomware attacks in at least one computer network in at least one computer network.

BACKGROUND OF THE INVENTION

Ransomware attacks (or cyber extortion) have become common in computer networks. In recent years, there has been a spike in the number of reported incidents as well as the funds that cyber hackers are attempting to extort from organizations. Ransomware attacks are not only increasing in frequency, they are also becoming more sophisticated and complex. Ransomware attacks are becoming a popular attack vector and effectively shutting down public sector networks.

Two major vulnerabilities are being exploited: Networked Attached Storage (NAS) including endpoint computers network-based file-access attacks and/or Windows Operating System process/memory injection file-less attacks. The number of ransomware attacks on organizations is increasing at several orders of magnitude over the past years, and these attacks are projected to cost businesses dozens of billions of USD, in addition to the cost of loss of customer/partner loyalty and trust.

Some currently available solutions are based on endpoint security agents running on the computer hosts, looking for specific signatures of ransom attacks that are found during extensive low-level research. The main limitations of this approach are that the defenders are required to cover their entire endpoints with detection tools and with the increasing size of networks and number of endpoints, it is becoming increasingly impossible to cover each and every endpoint (not to mention the prohibitive cost). Furthermore, the defenders are required to continuously update their software, with any new attack signature being discovered, in order to vaccinate their network and endpoints from this new attack, while the attackers try to act quickly before the updates. With the increasing size of networks and number of endpoints, as well as its complex architecture, defense against all attackers is becoming increasingly impossible. Furthermore, the strong dependence on tailor-made discovery of the threat signature is giving rise to zero-day attacks which are going unnoticed. In this constant race between the defenders and attackers, the attackers keep winning. Since un-detected attacks are often being detected only long afterwards, files may be encrypted and inaccessible.

SUMMARY

There is thus provided, in accordance with some embodiments of the invention, a method of determining file-access patterns in at least one computer network, the network including a file-access server, the method including: training, by a processor in communication with the computer network, a first machine learning (ML) algorithm with a first training dataset including vectors representing network traffic such that the first ML algorithm learns to determine network characteristics associated with file-access traffic, using the first ML algorithm, determining, by the processor, network characteristics based on highest interaction of traffic with the file-access server compared to other interactions in the at least one computer network, and determining, by the processor, file-access patterns in the at least one computer network based on the network characteristics associated with file-access traffic.

In some embodiments, a second ML algorithm is trained (e.g., by the processor) with a second training dataset including vectors representing network traffic such that the second ML algorithm identifies a file-access anomaly in the sampled network traffic based on the network characteristics learned by the first ML algorithm, and a normalized difference is determined (e.g., by the processor) between a new input vector representing sampled network traffic and the vectors in the second training dataset. In some embodiments, the anomaly is identified when a normalized difference that is larger than difference between the new input vector and the vectors in the second training dataset is determined.

In some embodiments, the second ML algorithm includes at least one of: an auto-encoder deep-learning network architecture and a generative adversarial network (GAN) architecture. In some embodiments, the second ML algorithm is trained for input reconstruction, and wherein the second ML algorithm outputs a larger normalized loss for anomaly input in file-access traffic than for file-access traffic without anomalies. In some embodiments, an active learning mechanism is applied to update at least one detection model based on a user feedback loop. In some embodiments, a loss determined by the second ML algorithm is normalized (e.g., by the processor) based on the output of the first ML algorithm for the new input vector, wherein the output of the first ML algorithm is different from the output of the second ML algorithm for the second training dataset, and wherein the second ML algorithm is configured to allow a model trained in one installation to serve as a base model in another installation by normalizing the loss vectors of each installation In some embodiments, a third ML algorithm is trained (e.g., by the processor) with a third training dataset including vectors representing network traffic such that the third ML algorithm detects at least one ransom attack property based on at least one communication pattern in the anomaly sampled network traffic, when the third ML algorithm receives a new input vector not in the third training dataset and representing sampled network traffic, and the third ML algorithm is applied on the sampled network traffic. In some embodiments, the at least one ransom attack property is determined based on highest interaction frequency with the file-access server.

In some embodiments, the sampled network traffic is sampled on a network attached storage (NAS). In some embodiments, the sampled network traffic includes vectors each representing a different time interval.

Embodiments of the invention include a device for determining file-access patterns in at least one computer network including a file-access server, the device including: a memory, to store a first training dataset, and a processor in communication with the computer network, wherein the processor is configured to: train a first machine learning (ML) algorithm with a first training dataset including vectors such that the first ML algorithm learns network characteristics associated with file-access traffic, when the first ML algorithm receives input vectors representing sampled network traffic, determine network characteristics associated with file-access traffic based on highest interaction of traffic with the file-access server compared to other interactions in the at least one computer network, and determine file-access patterns in the at least one computer network based on the network characteristics associated with file-access traffic.

In some embodiments, the processor is configured to train a second ML algorithm with a second training dataset including vectors such that the second ML algorithm identifies an anomaly in the sampled network traffic based on the learned network characteristics, when the second ML algorithm receives a new input vector representing sampled network traffic, apply the second ML algorithm on the sampled network traffic, and determine a normalized difference between the new input vector and the vectors in the second training dataset, wherein a normalized difference that is larger than difference of the second training dataset corresponds to a file-access anomaly in the sampled network traffic.

In some embodiments, the second ML algorithm includes at least one of: an auto-encoder deep-learning network architecture and a generative adversarial network (GAN) architecture. In some embodiments, the second ML algorithm is trained for input reconstruction, and wherein the second ML algorithm outputs a larger normalized loss for anomaly input in file-access traffic. In some embodiments, the processor is further configured to apply an active learning mechanism to update at least one detection model based on a user feedback loop. In some embodiments, the processor is further configured to normalize a loss determined by the second ML algorithm based on the output of the first ML algorithm for the new input vector being different from the output of the second ML algorithm for the second training dataset, wherein the second ML algorithm is configured to allow a model trained in one installation to serve as a base model in another installation by normalizing the loss vectors of each installation.

In some embodiments, the processor is configured to train a third ML algorithm with a third training dataset including vectors such that the third ML algorithm detects at least one ransom attack property based on at least one communication pattern in the anomaly sampled network traffic, when the third ML algorithm receives a new input vector representing sampled network traffic, and apply a third ML algorithm on the sampled network traffic. In some embodiments, the at least one ransom attack property is determined based on highest interaction with the file-access server.

In some embodiments, the sampled network traffic is sampled on a network attached storage (NAS). In some embodiments, the sampled network traffic includes vectors each representing a different time interval.

There is thus provided, in accordance with some embodiments of the invention, a method of identifying an anomaly in at least one computer network including a file-access server, the method including: applying (e.g., by a processor) in communication with the computer network, a first machine learning (ML) algorithm trained to learn to determine network characteristics associated with sampled file-access traffic, wherein the network characteristics associated with file-access traffic are determined based on highest interaction with the file-access server, and applying (e.g., by the processor) a second ML algorithm trained to identify an anomaly in the sampled network traffic based on the determined network characteristics. In some embodiments, the anomaly is identified, using the second ML algorithm, based on a calculated normalized difference between training datasets and new sampled network traffic, and wherein a large normalized difference corresponds to a file-access anomaly in the sampled network traffic.

In some embodiments, a third ML algorithm is applied (e.g., by the processor) to detect at least one ransom attack property based on at least one communication pattern in the anomaly sampled network traffic, where the at least one ransom attack property is determined based on largest interaction frequency with the file-access server.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
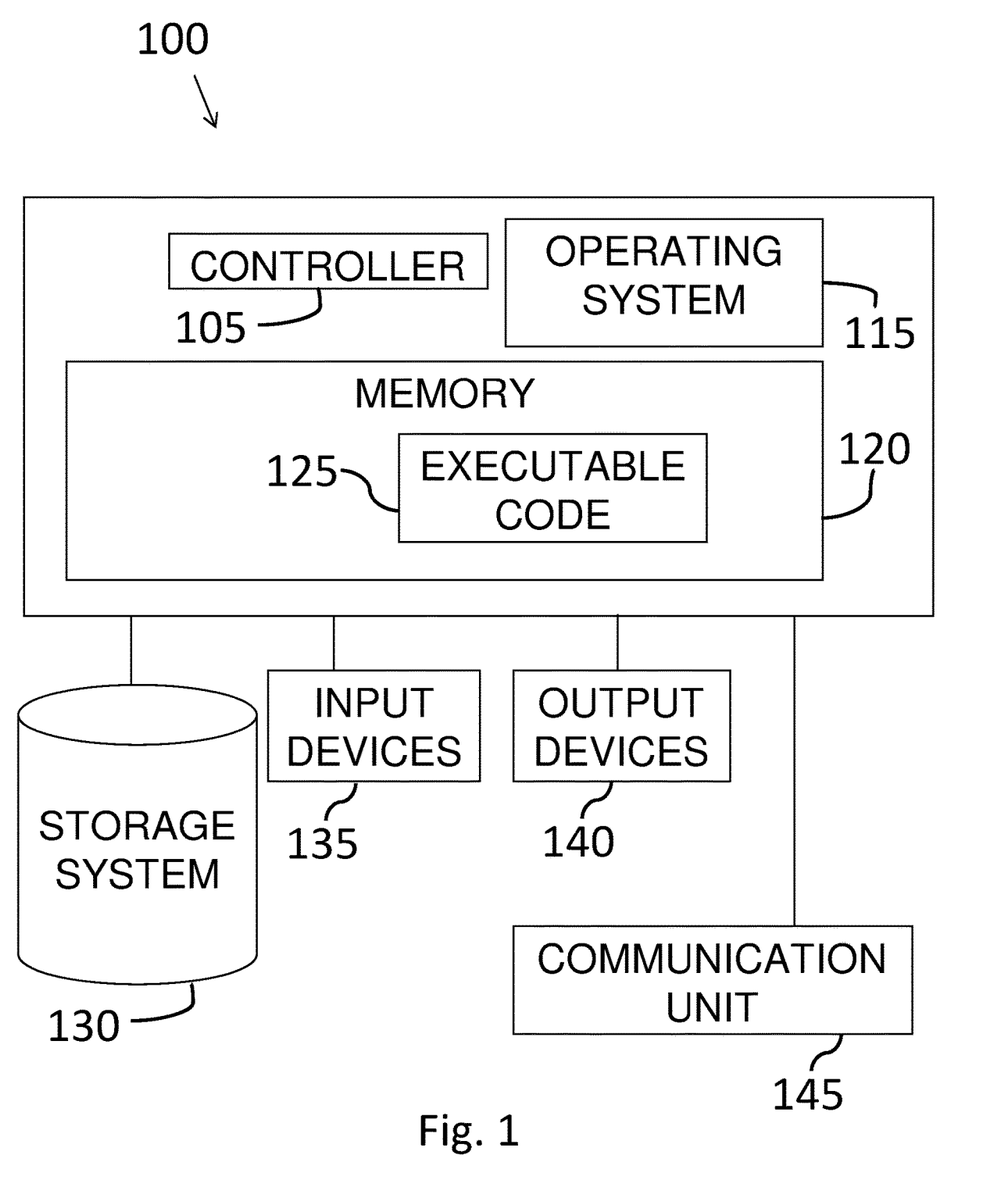
FIG. 1 shows a block diagram of an exemplary computing device, according to some embodiments of the invention.

Reference is made to FIG. 1, which is a schematic block diagram of an example computing device 100, according to some embodiments of the invention. Computing device 100 may include a controller or processor 105 (e.g., a central processing unit processor (CPU), a programmable controller or any suitable computing or computational device), memory 120, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a computer communication network, such as, for example, the Internet. The computing device 100 may operate by executing an operating system 115 and/or executable code 125. Controller 105 may be configured to execute program code to perform operations described herein. The system described herein may include one or more computing devices 100, for example, to act as the various devices or the components shown in FIG. 2. For example, system 200 may be, or may include computing device 100 or components thereof.

Operating system 115 may be or may include any code segment or one or more code sets (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be, for example, a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

According to some embodiments, deep-learning technology (e.g., employing neural networks) is applied to infer "file-access" patterns based on network characteristics, and detect ransomware attacks by discovering suspicious abnormal patterns in the inferred "file-access" patterns over time. The file-access traffic may include network communications within a computer network (e.g., of an organization) between users and file-access servers. A file-access pattern may be a pattern of data flow to network elements related to the file-access traffic. The file-access traffic pattern may include records, such as "ip_src"/"ip_dest"/"port_src"/"port_dst", to be stored in the data-structure of the file-access pattern, where "ip_src" is the user's workstation IP address, "ip_dst" is the file-access server IP address, and "port_src"/"dst_port" are the source port and destination port used for communication. For example, a file-access pattern may be a pattern of a particular port, in communication with a file-access server, that is being accessed (or where an interaction with the file-access server is identified) multiple times every hour. A network characteristic may be a feature of the network that is related to data flow, for instance network fields such as ports, protocols, IP addresses, etc. The "file-access" patterns may be learned based on sampled features that are included, or "built-in", in the NAS gateways (e.g., sFlow and NetFlow sampling protocols), thus some embodiments do not require any hardware and/or software modifications to the network.

For example, when user' data is backed up, the respective backup protocol may be used to communicate between the user and backup servers. In many cases, SMB (Simple-Message-Block) protocol is used, thus the file-access pattern records may be for example (ip_src, ip_dest=1.1.1.1, port_src, port_dst=445), where '1.1.1.1' denotes the 'backup server IP address' and '445' denotes the destination port of the communication, which is the SMB port. In another example, when a user is accessing a shared file which is stored in the file-access servers, the File-Transfer-Protocol (FTP) server may be used, such that the file-access pattern records may be (ip_src, ip_dest=2.2.2.2, port_src, port_dst=21), where '2.2.2.2' denotes the 'file server IP' and '21' denotes the destination port of the communication, which is the FTP port. In these examples, the network characteristic are: backup port: 445, file transfer port: 21, backup IP: 1.1.1.1, file server IP: 2.2.2.2.

A neural network (NN), e.g. a neural network implementing machine learning, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

In some embodiments, the normal file-access pattern (e.g., normal file-access behavior without malicious attacks) may be learned to predict the file-access anomalies and ransom attacks using a transfer learning carried out by normalizing auto-encoder losses of each device in the network. The loss normalization may allow transforming different behaviors to a single framework which is feeding a global ransom detection model, thus agnostic to a specific deployment. Loss functions may be used to determine the error (or the loss) between the output of ML algorithms and the given target value, such that the loss function may express how far off the target the computed output is compared to its actual output value. Accordingly, the learning may keep improving from one NAS network to another, by normalizing calculated loss-vectors which measure the difference between the actual input and the auto-encoder reconstruction, yielding high loss for abnormal file-access behavior (e.g., a ransom attack) while yielding low loss for normal behaviors. For example, loss normalization may be carried out by min-max scaling, norm scaling, etc.

Figure 2:
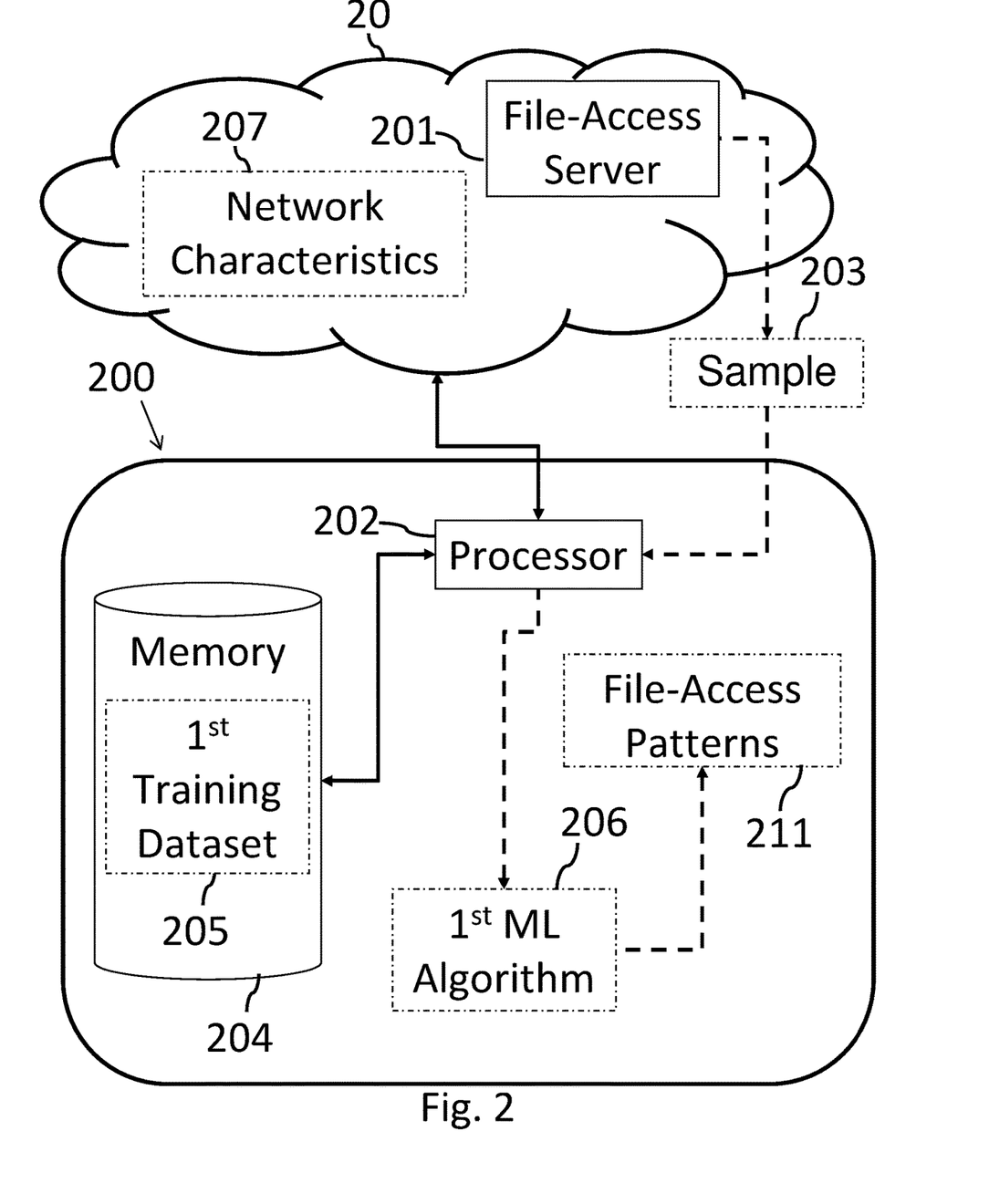
FIG. 2 shows a block diagram of a device for learning file-access patterns in at least one computer network including a file-access server, according to some embodiments of the invention.

Reference is now made to FIG. 2, which shows a block diagram of a device 200 for learning file-access patterns 211 in at least one computer network 20 including a file-access server 201, according to some embodiments. In FIG. 2, hardware elements are indicated with a solid line and the direction of arrows may indicate the direction of information flow.

The device 200 may include a processor 202 (e.g., such as the controller 105 shown in FIG. 1) in active communication with at least one network 20. For example, the at least one network 20 may be a computer network with at least partial wireless communication (e.g., via Wi-Fi, Bluetooth, etc.). In some embodiments, the processor 202 may be actively connected to the at least one network 20 in order to sample the traffic there, though the processor 202 may or may not perform other functions of the at least one network 20. For instance, in some embodiments, the device 200 including the processor 202 may be a computing device physically connected to the at least one network 20 for network traffic sampling.

In some embodiments, the processor 202 may analyze traffic (e.g., analyze network packets) passing through the at least one network 20 by analyzing a sample 203 of the traffic, such that the file-access patterns 211 may be learned from the retrieved traffic sample 203, as further described hereinafter. For example, the sampled network traffic may be sampled on the network gateways (routers, switches, etc.) of a network including the network attached storage (NAS). In some embodiments, the traffic sample 203 is converted into a vector, for example (ip_src, ip_dest, port_src, port_dst), as input for machine learning algorithms used by the processor 202.

In some embodiments, the processor 202 may sample traffic in a predefined location of the at least one network 20. For example, the processor 202 may be a router's processor which executes dedicated software to determine the file-access patterns 211, or the processor 202 may be connected to the router, and sample traffic in one or more predefined nodes of the at least one network 20.

In some embodiments, the processor 202 may retrieve copies of network samples (e.g., randomly chosen packets) from between at least one network device or node of the at least one network 20 and the processor 202 (or another part of the at least one network 20). For example, the at least one network device or node may be a communication link, a single communication switch or server, a group of links and/or servers, and/or total traffic in the network. In another example, the processor 202 may retrieve copies of randomly chosen packets from the servers, network gateways, switches, routers, and/or communication.

According to some embodiments, the device 200 includes a memory 204 configured to store a first training dataset 205 including vectors. For example, the dataset 205 may include vectors of network fields (e.g., ports, protocols, IP addresses, etc.) that have significant traffic interactions with file-access servers (e.g., the top $90^{th}$ percentile).

The processor 202 may train a first machine learning (ML) algorithm 206 with the first training dataset 205. The first ML algorithm 206 may be trained to learn to determine network characteristics 207 that are associated with file-access traffic, when the first ML algorithm 206 receives input vectors representing sampled network traffic 203. The traffic vector may be for example a time-ordered list of tuples, consisting of network fields such as source-IP, destination-IP, source-port, destination-port, etc. Such traffic vector may be for instance: [(ip_src='1.1.1.1', ip_dst='2.2.2.2', port_src=50000, port_dst=445, time='10:00'), . . . , (ip_src='3.3.3.3', ip_dst='4.4.4.4', port_src=55000, port_dst=21, time='10:05')].

For example, the first ML algorithm 206 may be trained with the first training dataset 205 to determine network characteristics or fields that have significant traffic interactions with file-access servers (e.g., the top $90^{th}$ percentile). For example, the dataset 205 may include a specific protocol type that is always used for data flow in the file-access server such that the characteristics of that protocol may be learned. After training, when the first ML algorithm 206 receives new input of sampled network traffic 203, the first ML algorithm 206 may determine network characteristics 207 (e.g., ports, protocols, IP addresses, etc.) that are associated with file-access traffic.

In some embodiments, to determine network characteristics 207, the first ML algorithm 206 receives as input network traffic data and returns a list of network fields (or characteristics) that most significantly interact with the file-access servers 201. The traffic may be analyzed in the network attached servers (NAS), where the network file-access servers are deployed. For example, for the traffic vector: [(ip_src='1.1.1.1', ip_dst='2.2.2.2', port_src=50000, port_dst=445, time='10:00'), . . . , (ip_src='3.3.3.3', ip_dst='4.4.4.4', port_src=55000, port_dst=21, time='10:05')], the determined network characteristics 207 may be the list [445, 21, '1.1.1.1', '2.2.2.2'], where backup port is 445, file transfer port is 21, backup IP is 1.1.1.1, and file server IP is 2.2.2.2.

In some embodiments, the first ML algorithm 206 (e.g., an auto-encoder) may be trained with the training dataset 205 for a particular day 'i', and the trained models of the auto-encoder may be used to infer on the following day i+1 and calculate loss vectors between the inference and the actual traffic. Thus, the first ML algorithm 206 may learn results of inference associated with smaller losses. For each new vector or network field, the norm of the vector may be calculated, and if the calculated norm is above a predefined threshold (e.g., corresponding to interactions with traffic or occurrences), then that field may be returned as the output. The first ML algorithm 206 may then converge to a set of network fields with significant traffic and stable patterns.

The first ML algorithm 206 may be trained with the first training dataset 205 to determine network characteristics or fields that have significant traffic interactions with file-access servers. In some embodiments, the processor 202 is configured to determine network characteristics 207 associated with file-access traffic, based on, using or by executing the first ML algorithm 206, and based on highest interaction rate of traffic with the file-access server 201 compared to other interactions in the at least one computer network 20. Each port number may be associated with its proportion of the file-access traffic, meaning, how much of the traffic (e.g., measured in percent) traversing the NAS gateways is associated with each port. Then, the port with highest proportion may be considered having the highest interaction rate. As one example, at port 445: there is 80%, at port 21: 10%, at ports 50000-60000: 5%, and all other ports 5%. In such case, port 445 may be considered as having the highest interaction rate.

The highest interaction rate or most significant network fields may be autonomously learned as related to the file-access traffic, for example, learning that a particular port has the highest interaction rate. The autonomous learning by the first ML algorithm 206 may allow immediate "time-to-model", in contrast to other machine learning based solutions that require long training and fine-tuning period.

The first ML algorithm 206 may automatically learn to determine network characteristics 207 as a set of features 'V' including network parameters related to file-access traffic, such as: ports, protocols, connections, etc. For example, for back-up traffic, the associated server message block (SMB) ports 137-139 and/or 445 may be learnt and used together with their associated IP addresses. Since every computer network 20 is different, with dedicated computing elements, the back-up traffic may be using different ports for different computer networks 20.

In some embodiments, the processor 202 is configured to determine file-access patterns 211 in the at least one computer network 20 based on the network characteristics 207 associated with file-access traffic.

Figure 3:
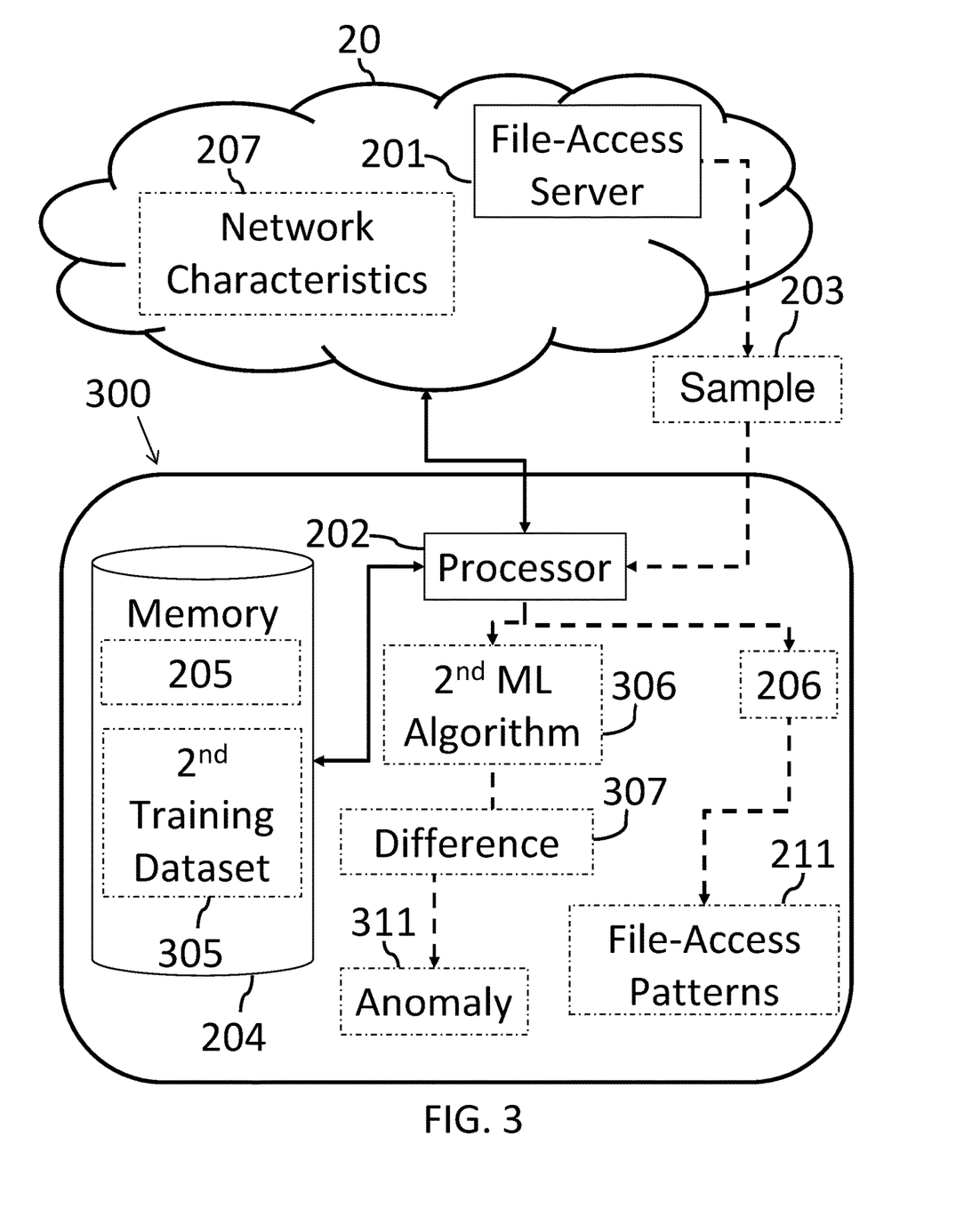
FIG. 3 shows a block diagram of a device for learning file-access patterns in at least one computer network including a file-access server, according to some embodiments of the invention.

Reference is now made to FIG. 3, which shows a block diagram of a device 300 for identifying anomalies 311 in at least one computer network 20 including a file-access server 201, according to some embodiments. In FIG. 3, hardware elements are indicated with a solid line and the direction of arrows may indicate the direction of information flow. In some embodiments, some elements of the device 300 may be similar to corresponding elements of the device 200 (shown in FIG. 2) that are indicated with the same numerals, for example the computer network 20, the file-access server 201, the processor 202, the first ML algorithm 206, etc.

According to some embodiments, the output of the first ML algorithm 206 may be used for reconstruction of the file-access patterns 211, by a second ML algorithm 306 (e.g., a trained auto-encoder model) to identify anomalies and threats and accordingly yield small losses for "normal" file-access traffic and high losses for "ransom" traffic. The processor 202 may be configured to train the second ML algorithm 306 with a second training dataset 305 including vectors (e.g., stored at the memory 204). After training, when the second ML algorithm 306 receives a new input vector representing sampled network traffic 203, the second ML algorithm 306 may identify an anomaly 311 in the sampled network traffic 203 based on the learned network characteristics 207. For example, the sampled network traffic may be sampled in the network gateways of a network attached storage (NAS).

The processor 202 may apply the second ML algorithm on the sampled network traffic 203 to determine a normalized difference 307 between the new input vector and a vector in the second training dataset 305 (for example, determine the average absolute difference of the new vector compared to a vector in the second training dataset 305). In some embodiments, a normalized difference that is larger than difference 307 between the new input vector and the vectors in the second training dataset 305 corresponds to a file-access anomaly 311 in the sampled network traffic 203. In some embodiments, the second ML algorithm 306 is trained for input reconstruction, and outputs a larger normalized loss for anomaly 311 input in file-access traffic.

In some embodiments, traffic aggregation metrics may be added to the set of features 'V' for anomaly 311 detection. The second training dataset 305 may include feature sets 'F' from the training data, where 'F' may include aggregation of traffic flows that were sampled in a specific window of time. A traffic flow, or set of packets with a common property, may be defined as several categories in the sample, for example: flows that are represented with sufficient number of packets in the sample to provide reliable estimates of their frequencies in the total traffic; flows that appear in too few packets in the sample to provide a reliable estimate for their frequency in the total traffic; and flows that appear in the traffic but do not appear in any packet in the sample.

The feature set 'F' may include general features related to the network traffic such as histogram of the number of flows that appear at a given time in the sample, how many of them were new with respect to the previous window of time, etc. For example, the feature set 'F' may be a vector with values for the number of packets.

The feature set 'F' may also include descriptive features related to file-access traffic such as spread of recorded file-access related traffic over various network fields (e.g., ports, IP addresses, protocols, etc.) as previously learnt. For example, the proportion of samples coming to and/or from port T (e.g., port 445 for proportion of SMB traffic) may be estimated. In another example, the proportion of samples broadcasted over protocol 'j' may be estimated.

Instead of using only the current time-window as input, the input data may include 'N' vectors (time intervals), including '$N_1$' vectors prior to the current time and '$N_2$' vectors after the current time, for instance in a sliding-window. For example, if N1=10 and N2=0 then a sliding-window of the last 10 time intervals may be used as input, where each interval has its corresponding feature sets 'F'.

In some embodiments, the second ML algorithm 306 includes at least one of: an auto-encoder deep-learning network architecture and a generative adversarial network (GAN) architecture. In some embodiments, different number of layers, sizes and architectures may be used, for example a multiplicative factor may be used to increase the hidden state size of each layer while keeping the same ratio between layers. Layer regularizations and/or dropouts may also be added to prevent training' overfitting.

For example, the second ML algorithm 306 may include an auto-encoder network with four hidden layers, where each layer is a long-short-term-memory (LSTM) of sizes 2, 4, 8 and 16, that are compressed into a latent-space representation. The decoder may include three symmetrical LSTM hidden layers of sizes 4, 8 and 16 which aim to reconstruct the input from the latent representation. The activation of each layer may be with a rectified linear unit (ReLU).

In some embodiments, training losses are calculated using mean-average-error (MAE) or its normalized variation which normalizes the loss to prevent fluctuations due to high input values. Accordingly, network optimization may be carried out using a stochastic gradient descent algorithm such as the 'Adam Optimization Algorithm' that can handle sparse gradients on noisy problems successfully. The loss vectors may be normalized to create a baseline of the training losses. For example, if the loss vectors are [1],[10],[0] then a simple min-max baseline is {MAX: 10, MIN: 0} such that a new value of 20 will be normalized to 2.

In some embodiments, the processor 202 is configured to apply an active learning mechanism to update at least one detection model based on a user feedback loop. For example, when a threat is detected, the user has an option to give feedback on the detected threat (e.g., indicating this was unusual, but yet a known backup procedure). Then, the normalized loss vectors associated with this detection may be tagged as "normal" and accordingly update the second ML algorithm 306 such that similar patterns may not be raised as alarms in the future. The normalization is carried out to transform the loss vectors of different network devices that belong to different networks with possibly varying characteristics, properties and behaviors to a unified language that is used hereinafter for the global detection models.

According to some embodiments, processor 202 is configured to normalize a loss determined by the second ML algorithm 306 based on the output of the first ML algorithm 206 for the new input vector being different from the output of the second ML algorithm 306 for the second training dataset 305. The second ML algorithm 306 may be configured to allow a model trained in one installation to serve as a base model in another installation by normalizing the loss vectors of each installation.

For example, during file-access pattern training, the input training data may be received from the second training dataset 305, and the output is the auto-encoder models and baseline. The feature sets 'F' are calculated and the auto-encoder models are trained on the calculated features 'F'. The trained models are used to calculate final loss vectors '$L_F$' and the final loss vectors '$L_F$' may be normalized to create a baseline. For example, the actual inputs for 'F' may be $\{F_1 \ldots F_N\}$, the auto-encoder reconstruction may be $\{\hat{F}_1 \ldots \hat{F}_N\}$, and the loss vectors 'L' may be calculated (e.g., calculate $|\hat{F}_i - F_i|$ for every 'i'). The loss vectors may be normalized to generate a baseline of the training losses. For example, if the final loss vectors '$L_F$' are [1],[10],[0] then a simple min-max baseline is {MAX: 10, MIN: 0} such that a new value of 20 may be normalized to 2.

In another example, during file-access pattern inferring, the input is a datapoint 'Z' representing sampled traffic, the trained auto-encoder model, and the normalized baseline model. The output is at least one normalized loss vector. The feature sets 'Z', are calculated and the trained auto-encoder models on 'Z' to calculate the loss vector '$L_Z$'. The final loss vectors '$L_Z$' may be normalized per baseline to get the normalized features as the output. For example, datapoint 'Z' may include a time-ordered list of tuples, consisting of network fields such as source-IP, destination-IP, source-port, destination-port, etc.: [(ip_src='1.1.1.1', ip_dst='2.2.2.2', port_src=50000, port_dst=445, time='10:00'), . . . , (ip_src='3.3.3.3', ip_dst='4.4.4.4', port_src=55000, port_dst=21, time='10:05')].

Figure 4:
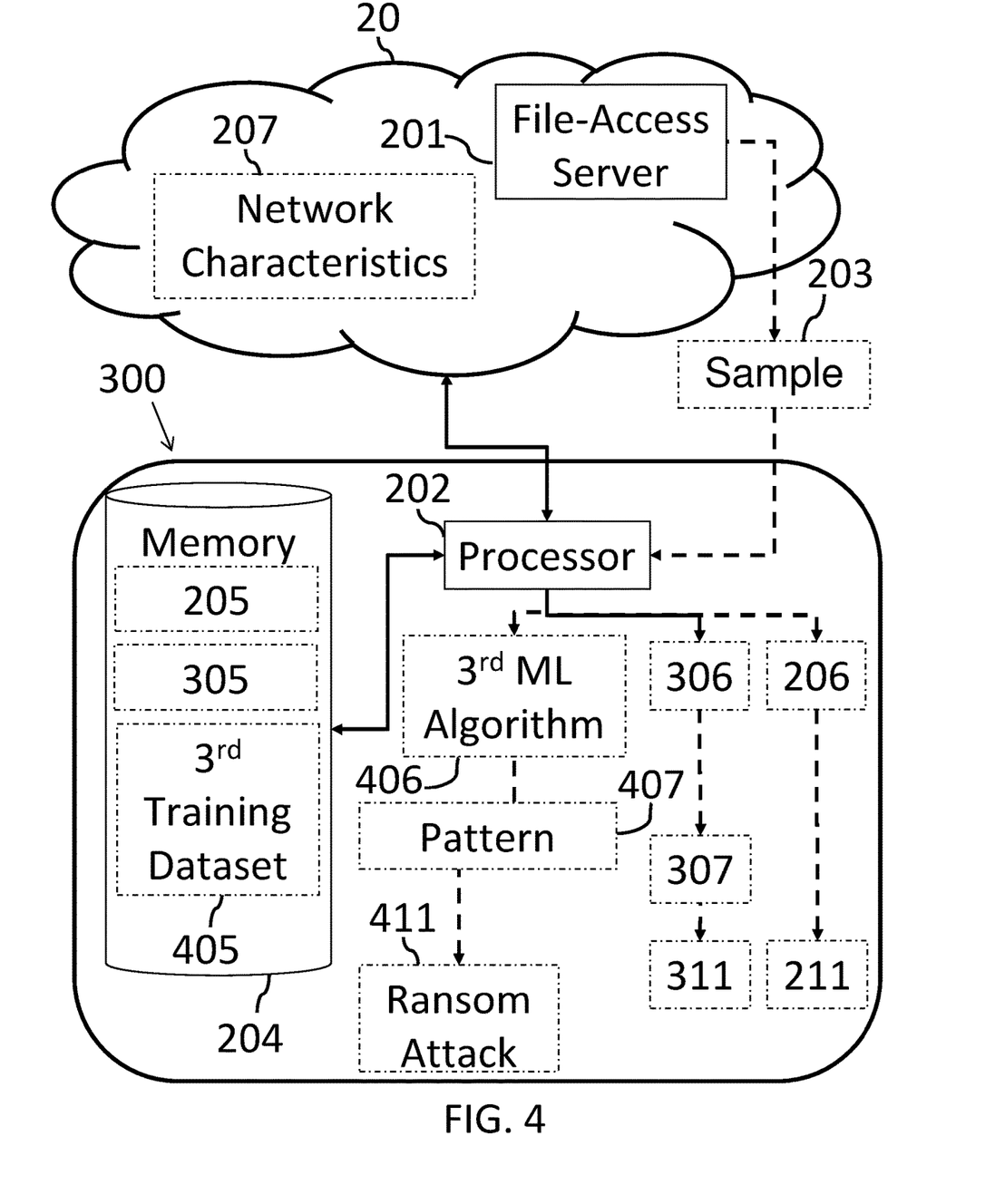
FIG. 4 shows a block diagram of a device for detection of at least one file-access anomaly of ransom attack property in the at least one computer network including a file-access server, according to some embodiments of the invention.

Reference is now made to FIG. 4, which shows a block diagram of a device 400 for detection of at least one file-access anomaly or ransom attack property 411 in the at least one computer network 20 including a file-access server 201, according to some embodiments. In FIG. 4, hardware elements are indicated with a solid line and the direction of arrows may indicate the direction of information flow. In some embodiments, some elements of the device 400 may be similar to corresponding elements of the device 200

(shown in FIG. 2) or the device 300 (shown in FIG. 3) that are indicated with the same numerals, for example the computer network 20, the file-access server 201, the processor 202, the first ML algorithm 206, etc.

According to some embodiments, the processor 202 is configured to train a third ML algorithm 406 with a third training dataset 405 including vectors. The third ML algorithm 406 may detect at least one file-access anomaly or ransom attack property 411 based on at least one communication pattern 407 in the anomaly sampled network traffic 203, when the third ML algorithm receives a new input vector representing sampled network traffic. For example, the sampled network traffic may be sampled on a network attached storage (NAS).

In some embodiments, the at least one file-access anomaly or ransom attack property 411 is determined based on highest interaction with the file-access server 201. The highest interaction or most significant network fields may be autonomously learned as related to the file-access traffic, for example, learning that a particular port has the highest interaction rate.

The input of the third ML algorithm 406 may be the normalized loss vector from the second ML algorithm 306, in order to detect and classify threats in a generic way which is agnostic to the specific deployment while continuing to learn and evolve with any new customer.

In some embodiments, the third training dataset 405 may include both normal traffic and also traffic with known threats. For each third training dataset 405, the auto-encoder model may be created with a baseline by training on normal traffic only. Then, the trained models may be applied with the third ML algorithm 406 on the threat traffic to create their normalized loss vectors of each datapoint with their threat tagging such that normal traffic or threat (e.g. ransom attacks) are detected. In some embodiments, the threat vectors may be concatenated to create the final dataset of loss-vectors and threats among the various devices in the computer network 20, such that the output of the second ML algorithm 306 may be used to train the third ML algorithm 406 to detect whether the loss-vectors are associated with normal file-access traffic or a threat.

In some embodiments, the global models of the third ML algorithm 406 may be feed-forward neural networks with one hidden-layer, where the output layer of the third ML algorithm 406 may be of size 2 denoting "normal" or "threat", while the output layer of a classifier may further denote various threat types. A classifier may include a classification model used in order to infer the file-access anomaly or ransom attack' properties and root-case information that have largest deviations from their training state. For example, the third ML algorithm 406 may include an auto-encoder with a structure with a hidden layer of size 16 and the output layer is of size 2 (where all sizes reflect the number of neurons). In some embodiments, the classifier may be implemented as a separate fourth ML algorithm, together with the detector ML algorithm.

In some embodiments, the third ML algorithm 406 includes a detector module and a classifier module. The third ML algorithm 406 may include one or more feed-forward neural networks with one hidden-layer, for instance where the detector's output layer mat be of size 2 denoting "normal" or "threat", while the classifier's output layer may denote various threat types. For example, the detector network structure may include a hidden layer of size 16 and the output layer of size 2 (e.g., where all sizes reflect the number of neurons). In another example, the model may classify the type of the detected anomaly as "ransomware attack over port 445" by observing significantly higher number of packets entering the network over port 445 which may result in large deviation of the feature associated with port 445 from its training state.

In some embodiments, the third ML algorithm 406 may employ a feedback loop. For example, when a threat is detected, the user has an option to give feedback on it, for instance telling this was an indeed unusual, but yet known, heavy backup procedure. Then, the normalized loss vectors associated with this detection may be immediately tagged as "normal" and trigger a new run of the third ML algorithm 406 such that similar patterns 407 may not be raised as alarms in the future, also in other customer' networks. In contrast, when the user's feedback acknowledging the threat, the respective normalized vectors may be tagged as "threat" and also trigger a new run of the third ML algorithm 406 to make sure similar patterns (even if not the exact same patterns) 407 won't be unnoticed.

Figure 5A:
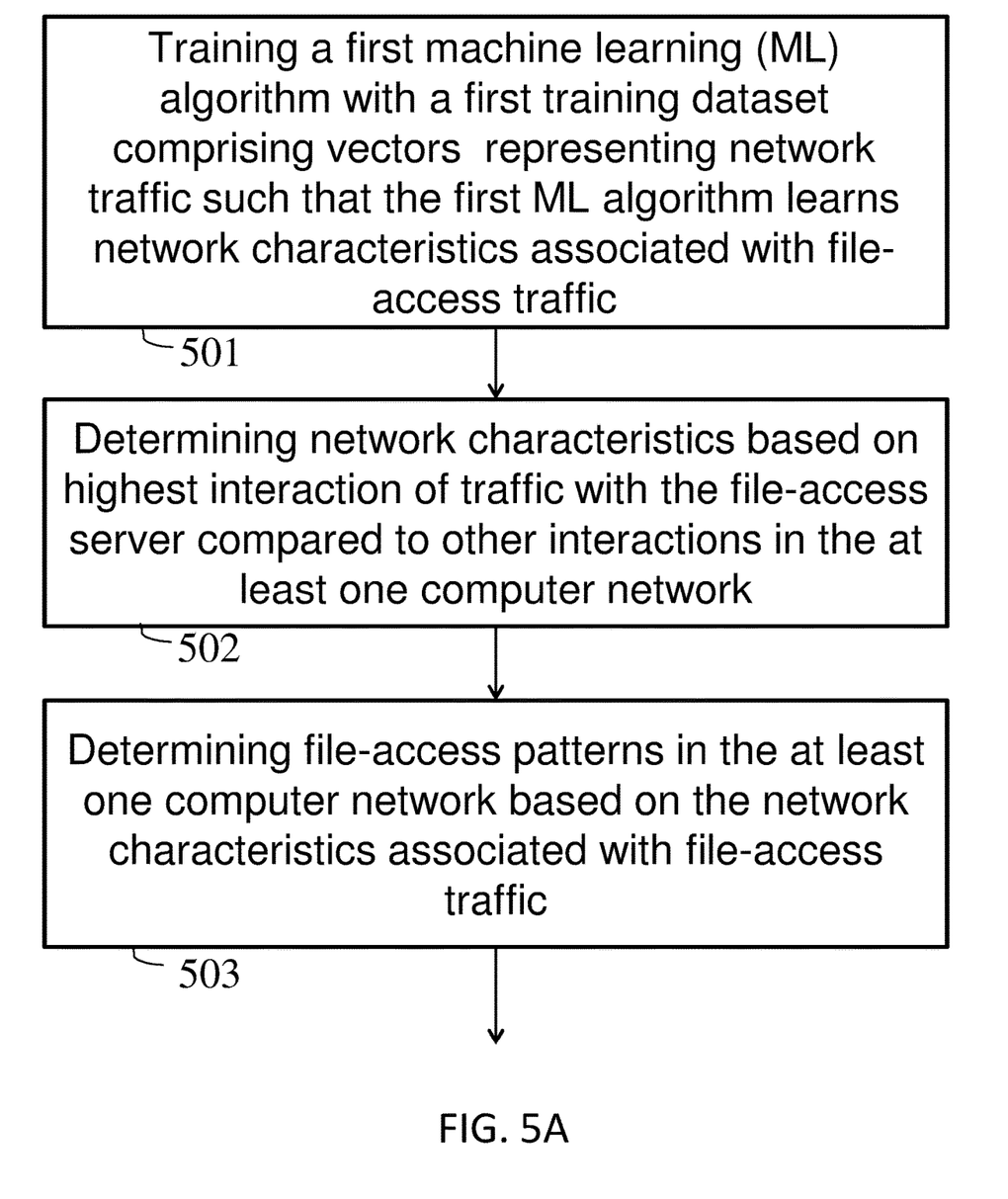
FIGS. 5A-5C show flowcharts of a method of determining file-access patterns in at least one computer network, the network including a file-access server, according to some embodiments of the invention.
Figure 5B:
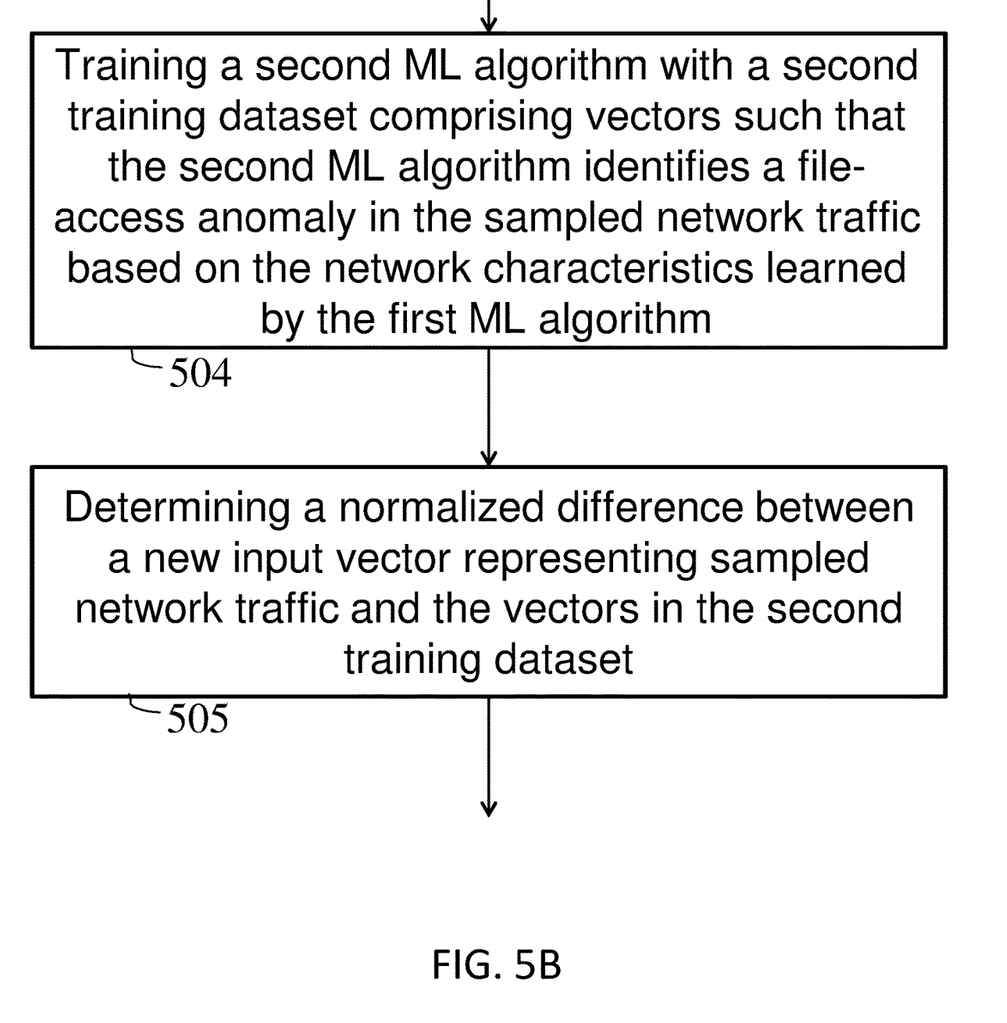
Figure 5C:
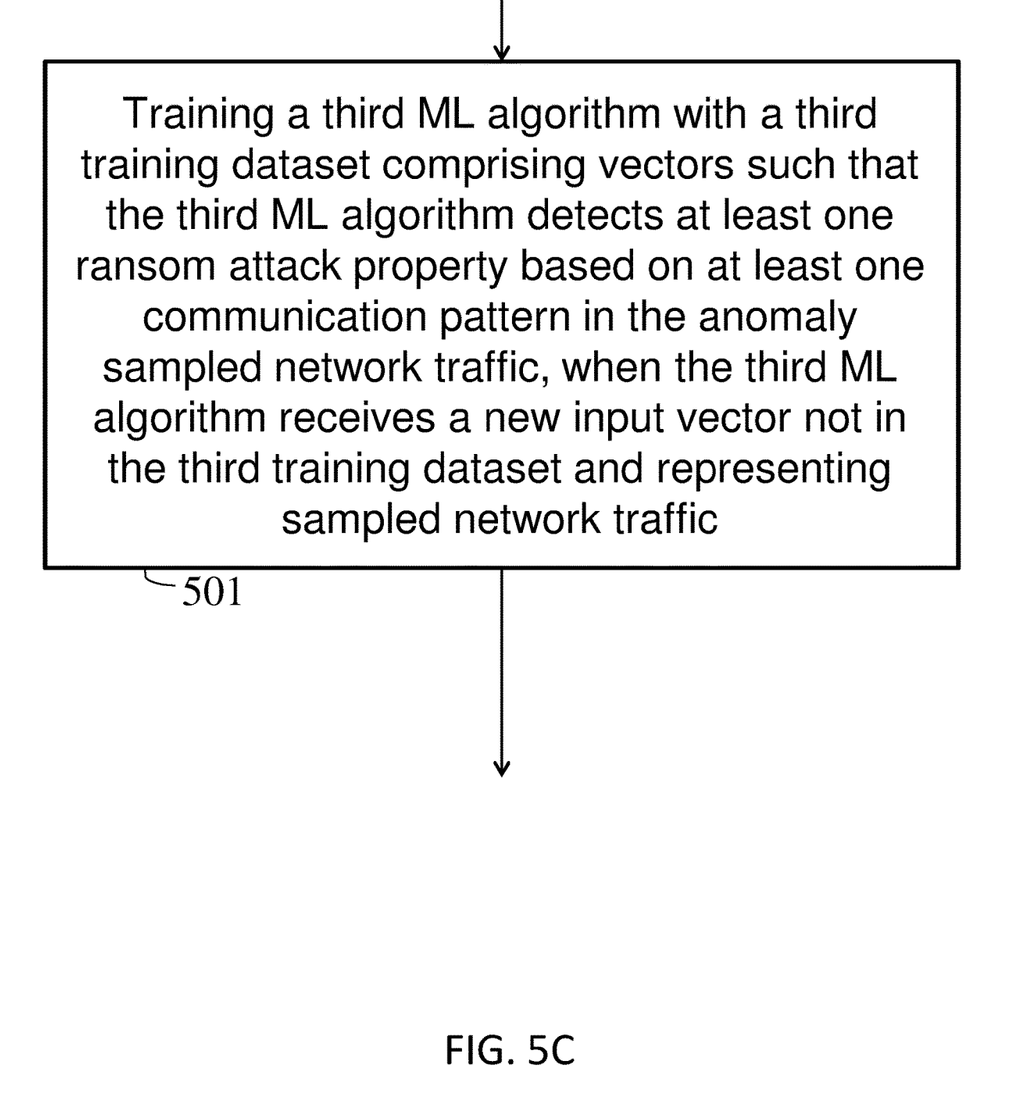

Reference is now made to FIGS. 5A-5C, which show flowcharts of a method of determining file-access patterns in at least one computer network, the network including a file-access server, according to some embodiments.

In Step 501, a first machine learning (ML) algorithm may be trained (e.g., by the processor 202 in communication with the computer network 20, as shown in FIGS. 2-4) with a first training dataset including vectors representing network traffic. Such that the first ML algorithm learns network characteristics associated with file-access traffic.

In Step 502, network characteristics may be determined (e.g., by the processor 202) based on highest interaction of traffic with the file-access server compared to other interactions in the at least one computer network.

In Step 503, file-access patterns may be determined (e.g., by the processor 202) in the at least one computer network based on the network characteristics associated with file-access traffic.

In Step 504, a second ML algorithm may be trained (e.g., by the processor 202) with a second training dataset including vectors such that the second ML algorithm identifies a file-access anomaly in the sampled network traffic based on the network characteristics learned by the first ML algorithm. In Step 505, a normalized difference may be determined (e.g., by the processor 202) between a new input vector representing sampled network traffic and the vectors in the second training dataset, wherein an anomaly is identified when a normalized difference that is larger than difference of the second training dataset is determined.

In Step 506, a third ML algorithm may be trained (e.g., by the processor 202) with a third training dataset including vectors such that the third ML algorithm detects at least one ransom attack property based on at least one communication pattern in the anomaly sampled network traffic, when the third ML algorithm receives a new input vector not in the third training dataset and representing sampled network traffic. The third ML algorithm may be applied on the sampled network traffic, where the at least one ransom attack property is determined based on highest interaction with the file-access server, for example the at least one ransom attack property may be determined according to highest interaction property (e.g., frequency of interactions with the file-access server) during the attack, such as the port number.

According to some embodiments, by monitoring NAS device traffic, the applied ML algorithms may be completely agnostic to the malware and/or ransom type and characteristics, as well as be robust from variations and changes to the attack that may cause current rule-based tools to not detect the attack.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other embodiments presented, and embodiments not specifically described may include various features described herein.

The invention claimed is:

1. A method of determining file-access patterns in at least one computer network, the network comprising a file-access server, the method comprising:
   training, by a processor in communication with the computer network, a first machine learning (ML) algorithm with a first training dataset comprising vectors representing network traffic such that the first ML algorithm learns to determine network characteristics associated with file-access traffic;
   using the first ML algorithm, determining, by the processor, network characteristics based on highest interaction of traffic with the file-access server compared to other interactions in the at least one computer network;
   determining, by the processor, file-access patterns in the at least one computer network based on the network characteristics associated with file-access traffic;
   training, by the processor, a second ML algorithm with a second training dataset comprising vectors representing network traffic such that the second ML algorithm identifies a file-access anomaly in the sampled network traffic based on the network characteristics learned by the first ML algorithm;
   determining, by the processor, a normalized difference between a new input vector representing sampled network traffic and the vectors in the second training dataset, wherein the anomaly is identified when a normalized difference that is larger than difference between the new input vector and the vectors in the second training dataset is determined;
   training, by the processor, a third ML algorithm with a third training dataset comprising vectors representing network traffic such that the third ML algorithm detects at least one ransom attack property based on at least one communication pattern in the anomaly sampled network traffic, when the third ML algorithm receives a new input vector not in the third training dataset and representing sampled network traffic; and
   applying the third ML algorithm on the sampled network traffic,
   wherein the at least one ransom attack property is determined based on highest interaction frequency with the file-access server.

2. The method of claim 1, wherein the second ML algorithm comprises at least one of: an auto-encoder deep-learning network architecture and a generative adversarial network (GAN) architecture.

3. The method of claim 1, wherein the second ML algorithm is trained for input reconstruction, and wherein the second ML algorithm outputs a larger normalized loss for anomaly input in file-access traffic than for file-access traffic without anomalies.

4. The method of claim 1, further comprising applying an active learning mechanism to update at least one detection model based on a user feedback loop.

5. The method of claim 1, further comprising normalizing, by the processor, a loss determined by the second ML algorithm based on the output of the first ML algorithm for the new input vector, wherein the output of the first ML algorithm is different from the output of the second ML algorithm for the second training dataset, and wherein the second ML algorithm is configured to allow a model trained in one installation to serve as a base model in another installation by normalizing the loss vectors of each installation.

6. The method of claim 1, wherein the sampled network traffic is sampled on a network attached storage (NAS).

7. The method of claim 1, wherein the sampled network traffic comprises vectors each representing a different time interval.

8. A device for determining file-access patterns in at least one computer network comprising a file-access server, the device comprising:
   a memory, to store a first training dataset; and
   a processor in communication with the computer network, wherein the processor is configured to:
   train a first machine learning (ML) algorithm with a first training dataset comprising vectors such that the first ML algorithm learns network characteristics associated with file-access traffic, when the first ML algorithm receives input vectors representing sampled network traffic;
   determine network characteristics associated with file-access traffic based on highest interaction of traffic with the file-access server compared to other interactions in the at least one computer network;
   determine file-access patterns in the at least one computer network based on the network characteristics associated with file-access traffic;
   train a second ML algorithm with a second training dataset comprising vectors such that the second ML algorithm identifies an anomaly in the sampled network traffic based on the learned network characteristics, when the second ML algorithm receives a new input vector representing sampled network traffic;
   apply the second ML algorithm on the sampled network traffic;
   determine a normalized difference between the new input vector and the vectors in the second training dataset, wherein a normalized difference that is larger than difference of the second training dataset corresponds to a file-access anomaly in the sampled network traffic;
   train a third ML algorithm with a third training dataset comprising vectors such that the third ML algorithm detects at least one ransom attack property based on at least one communication pattern in the anomaly sampled network traffic, when the third ML algorithm receives a new input vector representing sampled network traffic; and
   apply a third ML algorithm on the sampled network traffic,
   wherein the at least one ransom attack property is determined based on highest interaction with the file-access server.

9. The device of claim 8, wherein the second ML algorithm comprises at least one of: an auto-encoder deep-learning network architecture and a generative adversarial network (GAN) architecture.

10. The device of claim 8, wherein the second ML algorithm is trained for input reconstruction, and wherein the second ML algorithm outputs a larger normalized loss for anomaly input in file-access traffic.

11. The device of claim 8, wherein the processor is further configured to apply an active learning mechanism to update at least one detection model based on a user feedback loop.

12. The device of claim 8, wherein the processor is further configured to normalize a loss determined by the second ML algorithm based on the output of the first ML algorithm for the new input vector being different from the output of the second ML algorithm for the second training dataset, wherein the second ML algorithm is configured to allow a model trained in one installation to serve as a base model in another installation by normalizing the loss vectors of each installation.

13. The device of claim 8, wherein the sampled network traffic is sampled on a network attached storage (NAS).

14. The device of claim 8, wherein the sampled network traffic comprises vectors each representing a different time interval.

* * * * *